(12) United States Patent
Yamamoto et al.

(10) Patent No.: US 10,657,337 B2
(45) Date of Patent: May 19, 2020

(54) RFID TAG AND RFID SYSTEM

(71) Applicant: KYOCERA Corporation, Kyoto-shi, Kyoto (JP)

(72) Inventors: Shuuichi Yamamoto, Kirishima (JP); Kensou Ochiai, Kawasaki (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 16/092,800

(22) PCT Filed: Apr. 11, 2017

(86) PCT No.: PCT/JP2017/014772
§ 371 (c)(1),
(2) Date: Oct. 11, 2018

(87) PCT Pub. No.: WO2017/179562
PCT Pub. Date: Oct. 19, 2017

(65) Prior Publication Data
US 2019/0163939 A1    May 30, 2019

(30) Foreign Application Priority Data

Apr. 13, 2016  (JP) .................. 2016-080388

(51) Int. Cl.
| | |
|---|---|
| *G06K 7/10* | (2006.01) |
| *H01Q 1/40* | (2006.01) |
| *G06K 19/077* | (2006.01) |
| *G06K 19/02* | (2006.01) |
| *H01F 38/14* | (2006.01) |
| *H01Q 7/06* | (2006.01) |

(52) U.S. Cl.
CPC ........ *G06K 7/10316* (2013.01); *G06K 19/02* (2013.01); *G06K 19/077* (2013.01); *G06K 19/07749* (2013.01); *H01F 38/14* (2013.01); *H01Q 1/40* (2013.01); *H01Q 7/06* (2013.01)

(58) Field of Classification Search
CPC .................................... G06K 7/10316
USPC ...................................... 235/451
See application file for complete search history.

(56) References Cited

U.S. PATENT DOCUMENTS

| | | | |
|---|---|---|---|
| 2012/0269728 A1* | 10/2012 | Jen | B01D 15/3804 424/9.1 |
| 2015/0325362 A1 | 11/2015 | Kumura et al. | |
| 2017/0344868 A1* | 11/2017 | Goodwin | G06K 19/07749 |

FOREIGN PATENT DOCUMENTS

| | | |
|---|---|---|
| JP | 2010-103313 A | 5/2010 |
| JP | 2013-210948 A | 10/2013 |
| JP | 2013-242698 A | 12/2013 |
| WO | 2011/108340 A1 | 9/2011 |

* cited by examiner

*Primary Examiner* — Allyson N Trail
(74) *Attorney, Agent, or Firm* — Volpe and Koenig, P.C.

(57) ABSTRACT

An RFID tag in the present disclosure includes an insulating substrate including an upper surface, a coil conductor disposed in the insulating substrate, a semiconductor element mounted on the upper surface of the insulating substrate, and a mold resin covering the upper surface of the insulating substrate and the semiconductor element. The mold resin contains a plurality of magnetic particles having particle sizes different from each other.

19 Claims, 5 Drawing Sheets

MAGNETIC FLUX  DIRECTION OF MAGNETIC FLUX

RFID TAG AND RFID SYSTEM

TECHNICAL FIELD

The present disclosure relates to a radio frequency identification (RFID) tag and an RFID system in which information is wirelessly transmitted and received between a semiconductor element and outside.

BACKGROUND ART

Detecting and managing information on various commodities by using semiconductor elements mounted on the commodities has been widely performed. Such semiconductor element is mounted, as a tag mounted on a substrate having a coil conductor, on various commodities. Transmission and reception of information is performed between the semiconductor element and an external device such as a reader/writer having a radio wave transmitting/receiving function.

The transmission and reception of information between the semiconductor element and the external device is performed by using the radio (RF) communication. An induced current is generated in the coil conductor by a magnetic flux caused by the radio wave transmitted from the external device, and an electric power necessary for the operation of the semiconductor element including writing and reading the information is supplied (refer to PTL 1, for example).

CITATION LIST

Patent Literature

PTL 1: International Publication No. 2011-108340

SUMMARY OF INVENTION

An RFID tag according to an aspect of the present disclosure includes an insulating substrate with an upper surface, a coil conductor in the insulating substrate, a semiconductor element on the upper surface of the insulating substrate, and a mold resin covering the upper surface of the insulating substrate and the semiconductor element. The mold resin contains a plurality of magnetic particles having particle sizes different from each other.

An RFID system according to an aspect of the present disclosure includes the RFID tag having the configuration described above, and a reader/writer that includes an antenna facing the coil conductor of the RFID tag.

DESCRIPTION OF EMBODIMENTS

In recent years, it is desired to mount a tag including the semiconductor element described above on the commodities such as various metal tools, jigs or utensils for the industrial use. However, when the tag including the semiconductor element is mounted on a metal commodity, an eddy current is generated in the metal commodity due to the magnetic flux associated with the radio wave transmitted from the outside. Being hindered by the eddy current, there is a high possibility that it becomes difficult to collect the magnetic flux in the coil conductor. The RFID tag in the present disclosure can reduce this possibility.

An RFID tag and an RFID system in an embodiment of the present disclosure will be described with reference to the accompanying drawings. Upper and lower portions are described in the following for explanatory convenience and do not limit the upper and lower portions when the RFID tag and the RFID system are actually used. The magnetic material in the following description is a ferromagnetic material.

Figure 1:
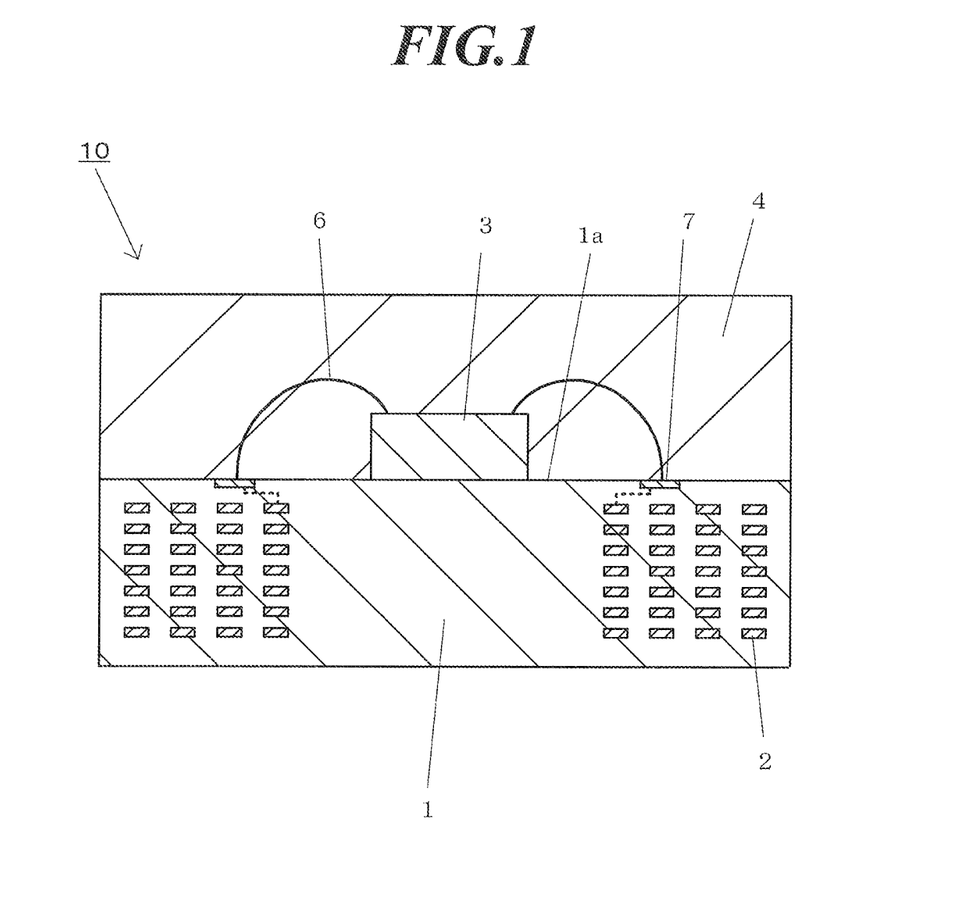
FIG. 1 is a sectional view illustrating an example of an RFID tag in an embodiment of the present disclosure.
Figure 2:
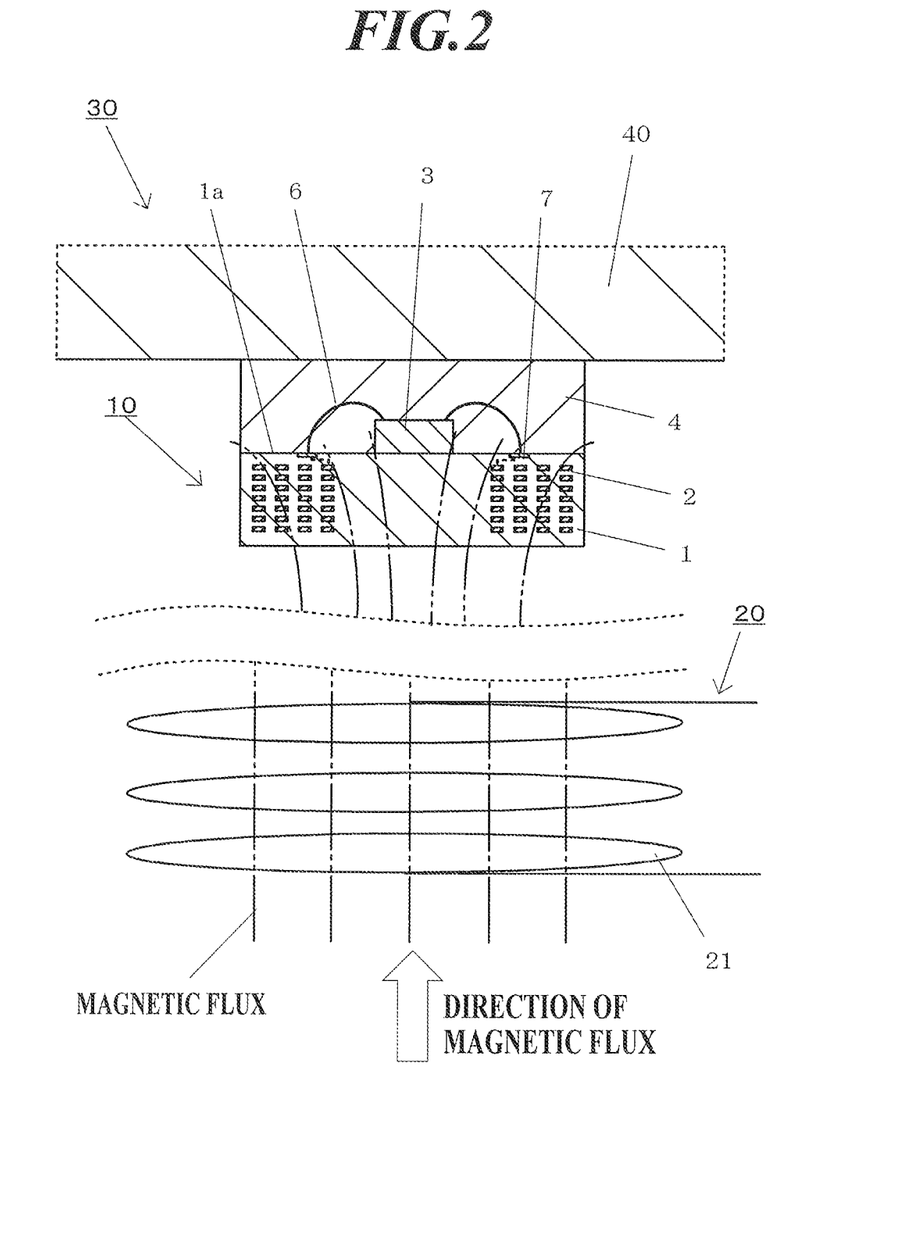
FIG. 2 is a sectional view illustrating an example of an RFID system in the embodiment of the present disclosure.
Figure 3A:
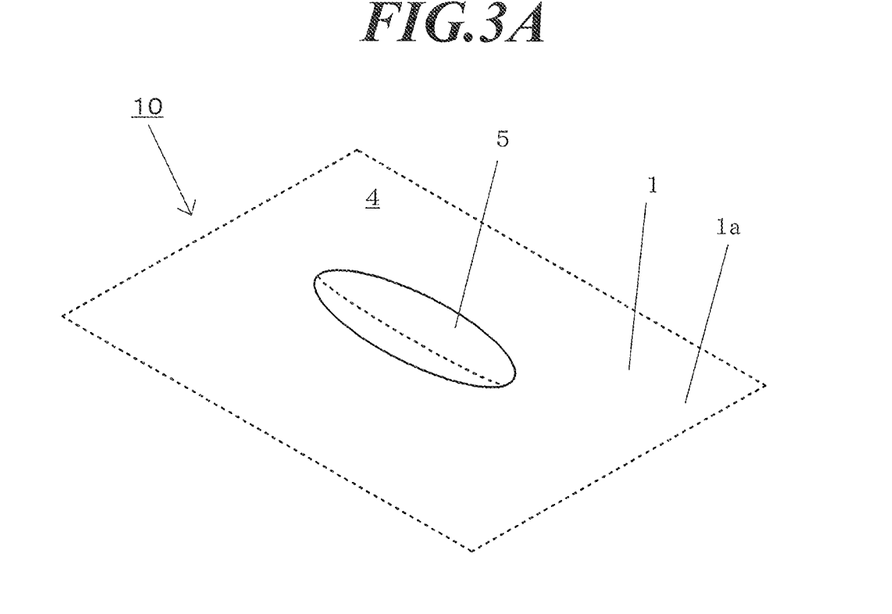
FIG. 3A is an enlarged perspective view illustrating an example of a main part of FIG. 1.
Figure 3B:
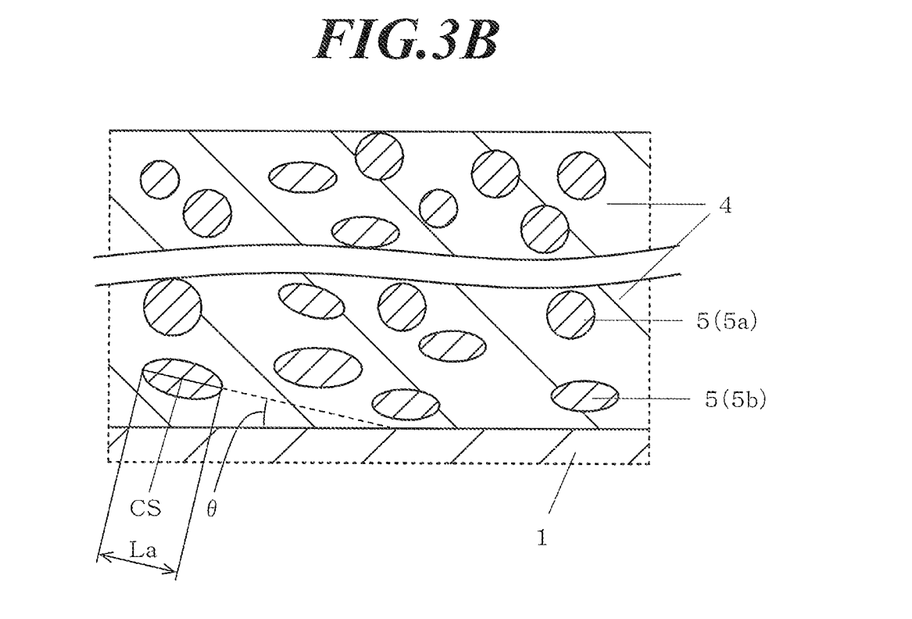
FIG. 3B is an enlarged sectional view illustrating an example of a main part of FIG. 1.

FIG. 1 is a sectional view illustrating an RFID tag according to the embodiment of the present disclosure, and FIG. 2 is a sectional view illustrating the RFID system according to the embodiment of the present disclosure. FIG. 3A is an enlarged perspective view illustrating an example of a main part of FIG. 1, and FIG. 3B is an enlarged sectional view illustrating an example of a main part of FIG. 1.

An RFID tag 10 of the embodiment basically includes an insulating substrate 1 with an upper surface 1a, a coil conductor 2 in the insulating substrate 1, a semiconductor element 3 on the upper surface 1a of the insulating substrate 1, and a mold resin 4 covering the upper surface 1a of insulating substrate 1 and the semiconductor element 3. As in the example illustrated in FIG. 3, the mold resin 4 includes a plurality of magnetic particles 5 having particle sizes different from each other. An RFID system 30 of the embodiment basically includes the RFID tag 10 and a reader/writer 20 having an antenna 21 facing the coil conductor 2 of the RFID tag 10.

The RFID tag 10 is mounted on various commodities 40 and used, and various kinds of information on the commodities 40 are written into the semiconductor element 3. In the RFID system 30 including the RFID tag 10, such information can be rewritten as appropriate in accordance with the information transmitted/received between the reader/writer 20 and the RFID tag 10. As a result, various kinds of information on the commodities 40 are updated as appropriate.

The insulating substrate 1 is a substrate for disposing the coil conductor 2 and for mounting and fixing the semiconductor element 3. In addition, the insulating substrate 1 is an electrically insulating substrate for arranging the coil conductor 2 in a predetermined pattern while securing the electrical insulation of the coil conductor 2 itself. In addition, the insulating substrate 1 is also a substrate for fixing the semiconductor element 3.

The insulating substrate 1 has, for example, a rectangular flat shape. The semiconductor element 3 is mounted on a center portion of the upper surface 1a of the insulating substrate 1. The coil conductor 2 is disposed in an outer peripheral portion in the insulating substrate 1 and surrounds the semiconductor element 3 in plan view. The magnetic flux passes through the inside of the coil conductor 2 surrounding the semiconductor element 3 in plan view, that is, passes through the part where the semiconductor element 3 is positioned, and induced current is generated at the coil conductor 2. Transmission and reception of information is performed between the semiconductor element 3 and the reader/writer 20.

The insulating substrate 1 is formed of an aluminum oxide sintered body, an aluminum nitride sintered body, a ceramic sintered body such as a mullite sintered body or a glass ceramic sintered body. If the insulating substrate 1 is made of, for example, the aluminum oxide sintered body, the insulating substrate 1 is manufactured as follows. First, raw material powder such as aluminum oxide and silicon oxide are molded into a sheet shape together with an appropriate organic binder and an organic solvent, and made into a plurality of ceramic green sheets having a rectangular sheet shape. Next, a laminate is made by laminating the ceramic green sheets. Thereafter, the insulating substrate 1 can be made by burning the laminate at a temperature of 1300 to 1600° C.

As described above, the coil conductor 2 is a part where the induced current is generated upon receiving the magnetic flux (change of the magnetic flux) due to the radio wave radiated from the antenna 21 of the reader/writer 20. That is, a current (electric power) necessary for the operation (writing and reading) of the semiconductor element 3 is supplied from the antenna 21 through the coil conductor 2. In addition, the transmission and reception of various pieces of information is performed between the RFID tag 10 and the reader/writer 20.

For example, as illustrated in FIG. 1, the coil conductor 2 has a structure in which a plurality of single layer coils (no reference sign) is laminated one above the other, and the upper and lower coils are connected in series with each other by internal conductors (not illustrated) such as via conductors or the like disposed in the insulating substrate 1. In other words, the coil conductor 2 in this embodiment has a solenoid shape extending in the thickness direction of the insulating substrate 1. When the magnetic flux passes through the center of the coil conductor 2, the induced current described above is generated in the coil conductor 2 due to the electromagnetic induction.

The number of windings of the coil conductor 2 may be appropriately set in accordance with various conditions such as predetermined induced current in the coil conductor 2, productivity and economic efficiency as the RFID tag 10, and the like.

The coil conductor 2 is formed of a metal material such as tungsten, molybdenum, manganese, copper, silver, palladium, gold, platinum, nickel, or cobalt. In addition, the coil conductor 2 may be formed of alloy materials or the like containing the above-mentioned metal materials. Such a metal material or the like is disposed in the insulating substrate 1 as a metal layer such as a metallized layer.

For example, if the coil conductor 2 is a metalized layer of tungsten, the coil conductor 2 can be formed by printing a metal paste prepared by mixing tungsten powder with an organic solvent and an organic binder at a predetermined position of a ceramic green sheet to be an insulating substrate 1 using a method such as screen printing or the like, and then, simultaneously burning the result.

The semiconductor element 3 is a part having a function of storing information on the commodity 40 on which the RFID tag 10 is mounted while frequently updating the information, and the function of transmitting (function of writing and reading) the information to the reader/writer 20.

The semiconductor element 3 and the coil conductor 2 are electrically connected to each other by a connecting material such as a bonding wire 6. In the example illustrated in FIG. 1, a terminal 7 electrically connected to the coil conductor 2 is disposed on the upper surface 1a of the insulating substrate 1. The coil conductor 2 and the terminal 7 are electrically connected to each other by an inner conductor (no reference sign) such as a via conductor indicated by a broken line. One end of the bonding wire 6 is connected to the terminal 7, and the other end of the bonding wire 6 is connected to the semiconductor element 3. In other words, the semiconductor element 3 and the coil conductor 2 are electrically connected to each other via the bonding wire 6, the terminal 7, and the internal conductor.

The mold resin 4 is a part that covers the semiconductor element 3 and protects the semiconductor element 3 from the outside moisture or the outside air such as oxygen and a mechanical stress or the like from the outside. Therefore, the mold resin 4 covers integrally from the upper surface 1a of the insulating substrate 1 to the semiconductor element 3.

The mold resin 4 also functions as a bonding material or an adhesive material for holding the magnetic particles 5 that guides the magnetic flux to the RFID tag 10 and fixing the magnetic particles 5 on the insulating substrate 1. The mold resin 4 may be any material as long as having a function as the covering material and the adhesive material for protecting the semiconductor element 3 from the external environment.

Examples of the resin material forming the mold resin 4 include epoxy resin, polyimide resin, silicone resin, and the like. In addition, filler particles such as silica particles or glass particles may be added to these resin materials. The filler particles are added, for example, to adjust various properties such as mechanical strength, moisture resistance, or electrical properties of the mold resin 4. The material for the mold resin 4 can be appropriately selected from various resin materials described above in accordance with the conditions such as workability (productivity) and economic efficiency at the time of manufacturing the RFID tag 10.

The commodity 40 on which the RFID tag 10 is mounted is various commodities for which the use history or the like in use is required. Examples of the commodities include tools such as jigs or working tools usable in various industrial processes such as machining, metal working, resin working, and the like. The tools also include consumable tools usable for cutting, polishing, or the like. In addition, not limited to industrial use, household daily necessities, agricultural products, various prepaid cards for transportation or the like, medical instruments, and the like are included in the commodity 40.

The RFID tag 10 may be mounted on the commodity 40 in a state in which the RFID tag 10 is turned upside down from the state illustrated in FIG. 1. That is, the RFID tag 10 can be mounted on the surface of the commodity 40 with the mold resin 4 facing the commodity 40 and with the insulating substrate 1 including the coil conductor 2 on the outside, that is, facing the antenna 21. In such mounting, it is advantageous in reducing the distance between the coil conductor 2 and the antenna 21.

A plurality of magnetic particles 5 contained in the mold resin 4 has a function of guiding the magnetic flux of the radio wave transmitted from the antenna 21 toward the mold resin 4, that is, in the example in FIG. 2, in the direction of the coil conductor 2 positioned between the mold resin 4 and the antenna 21. To obtain the effect of the magnetic particles 5, the coil conductor 2 may be positioned (sandwiched) between the antenna 21 and the magnetic particles 5.

FIG. 2 illustrates the RFID system 30 in which the commodity 40 is brought to be close to the antenna 21 from upward. In an opposite case (when the antenna 21 is positioned on the upper side of the RFID tag 10), the RFID tag 10 is mounted on the commodity 40 upside down with respect to the state illustrated in FIG. 1. The up/down direction at the time of actual use is not particularly limited, any direction may be used in the RFID system 30 as long as the coil conductor 2 is positioned between the antenna 21 and the magnetic particles 5 as described above.

As illustrated in FIG. 3B, for example, the magnetic particles 5 contain a plurality of magnetic particles 5 having particle sizes different from each other. As a result, dispersion of the magnetic particles 5 in the mold resin 4 is facilitated. In addition, as a result, the magnetic particles 5 can easily be contained in the mold resin 4 to an extent that the magnetic flux can be effectively guided in the direction of the coil conductor 2.

The magnetic particles 5 are formed by forming a magnetic material such as iron, nickel, and cobalt into a powder form. The magnetic particles 5 can be manufactured by, for example, a method such as a pulverization method of pulverizing an iron material with a mill, an ion reaction method of precipitating from a solution, or an atomization method using molten iron or the like.

An insulation treatment can be applied to the surface of the magnetic particles 5 such that the bonding wires 6 or the circuits formed on the semiconductor element 3 are not electrically connected to each other via the magnetic particles 5. In this treatment, various components such as phosphate can be applied. The ratio of the insulation treatment to each magnetic particle 5 can be appropriately adjusted so as not to be electrically connected, and to the extent that the peeling from the surface of the magnetic particle 5 due to heat, mechanical external force or the like can be prevented at the time of use.

For example, by adjusting the conditions such as the grinding time in the pulverization method, the concentration of the solution in the ion reaction method, or the cooling rate in the atomization method, the particle size of the magnetic particles 5 can be adjusted. In addition, after manufacturing a plurality of magnetic particles 5 (powder) having a particle size distribution, the plurality of magnetic particles 5 may be classified. By mixing the plurality of magnetic particles 5 again in an appropriate particle size ratio after the classification, it is also possible to adjust the particle size (distribution) of the magnetic particles 5 in the mold resin 4.

The plurality of magnetic particles 5 has, for example, spherical shape, and particle sizes are different from each other in a distribution range of about 0.5 to 50 μm as described later. The particle sizes of the magnetic particles 5 are different from each other within this distribution range. The form of the distribution may be a normal distribution or may be a discrete distribution. In addition, different particle sizes may be randomly included in the distribution with no regular form. The particle size of each magnetic particle 5 can be measured, for example, by electron microscope observation or the like.

The higher the content of the magnetic particles 5 in the mold resin 4, the more effectively the electromotive force due to the magnetic flux can be obtained, and the lower the content of the magnetic particles 5 in the mold resin 4, the adhesion strength of the mold resin 4 to the insulating substrate 1 can be increased. For example, if the mold resin 4 is an epoxy resin and the magnetic particles 5 are iron particles having a particle size of about 0.5 to 50 μm, the content of the magnetic particles 5 in the mold resin 4 may be set to approximately 85 to 95% by mass.

The content of the magnetic particles 5 in the mold resin 4 may be higher at the lower part of the mold resin 4 than at the upper part. In other words, the mold resin 4 may contain a higher ratio of the magnetic particles 5 in the part closer to the coil conductor 2. Further in other words, the mold resin 4 may have a higher ratio of the resin material in the upper part which is joined to the commodity 40.

In this case, since there are more magnetic particles 5 existing in the part near the coil conductor 2, the magnetic flux can be effectively guided to the coil conductor 2 (the center of the coil conductor 2). Therefore, for example, even if the commodity 40 is an industrial jig or a medical tool made of a metal, information is effectively and wirelessly transmitted and received between the coil conductor 2 (RFID tag 10) and the antenna 21 (reader/writer 20).

Since the ratio of the resin material in the mold resin 4, that is, the material for bonding is high in the portion joined to the commodity 40, it is advantageous for the RFID tag 10 to bond (adhere) to the commodity 40 easily and strongly.

The content of the magnetic particles 5 in the mold resin 4 can be determined from the area ratio of the magnetic particles 5 in the section, for example, by observing the longitudinal section of the mold resin 4 with an electron microscope or the like. At this time, for example, if an upper region (a region farthest from the insulating substrate 1) obtained by equally dividing the mold resin 4 into three parts in the thickness direction is defined as an upper part of the mold resin 4 and a lower region (a region closest to the insulating substrate 1) is defined as a lower part of the mold resin 4, the content of the magnetic particles 5 in the upper part and the content of the magnetic particles 5 in the lower part may be compared. The same applies to the upper part and the lower part which will be described later.

In order to make the content of the magnetic particles 5 in the mold resin 4 higher in the lower part of the mold resin 4 than that in the upper part, for example, magnetic particles 5 can be added to a resin material (uncured flowing material, hereinafter also referred to as uncured resin material) to be the mold resin 4, the resultant is applied to the upper surface 1*a* of the insulating substrate 1, the magnetic particles 5 are settled and the content of the magnetic particles 5 becomes higher in the insulating substrate 1 side, that is, in the lower part in the uncured resin material, the resin material is cured in such a state, and thus the mold resin 4 can be formed. Alternatively, two kinds of uncured resin material in which the contents of the magnetic particles 5 is different from each other are prepared, and one uncured resin material having a higher content of the magnetic particles 5 is applied to the upper surface 1*a* of the insulating substrate 1, and the other uncured resin material having a lower content of the magnetic particles 5 is coated thereon and cured, and then, the mold resin 4 can be formed. In this case, a resin material having the high content of the magnetic particles 5 may be cured, and then a resin material having the low content of the magnetic particles 5 may be applied and cured.

As illustrated in FIG. 3A, for example, the magnetic particles 5 may include magnetic particles 5 in flat shape (hereinafter also simply referred to as flat-shaped magnetic particles 5*b*). The flat-shaped magnetic particles 5*b* are disposed such that the flat surface extends along the upper surface 1*a* of the insulating substrate 1. The flat shape may be a shape in which the flat surface is plane or the flat surface is a curved surface. For example, the flat-shaped magnetic particles 5*b* have an elliptical shape having the similar lengths in the major axes in plan view and in side view (or longitudinal sectional view), and the length in the minor axis is shorter in the side view than that in the plan view. In other words, the flat-shaped magnetic particles 5*b* have an elliptical shape in plan view and in side view, both principal faces are convex curved surfaces, and side faces are also convex curved surfaces in which convex center portion in the thickness direction shows convex and a curvature radius thereof is smaller than that of principal faces. In the example in FIG. 3B, a section of the flat-shaped magnetic particles 5b is illustrated, and the width in the depth direction in the drawing is larger than the thickness of the flat-shaped magnetic particle 5b in this sectional view. If such flat-shaped magnetic particles 5b are disposed along the upper surface of the insulating substrate 1, the area of the magnetic particles 5 (5b) in plan view of the RFID tag 10 is larger than the area in the side view. Conversely, the fact the flat-shaped magnetic particles 5b are disposed along the upper surface 1a of the insulating substrate 1 means that the flat-shaped magnetic particles 5b are disposed so that the area of the flat-shaped magnetic particles 5b in plan view of the RFID tag 10 is larger than the area of the flat-shaped magnetic particles 5b in side view. Specifically, if the flat surface (the principal face in a plate shape) of the flat-shaped magnetic particles 5b is plane, the angle of the flat surface with respect to the upper surface 1a of the insulating substrate 1 is less than 45°. If the flat surface of the flat-shaped magnetic particles 5b is not a plane, as illustrated in FIG. 3B, the angle θ of a cross-sectional surface CS in which the cross-sectional surface (section in the direction perpendicular to the thickness direction) is the same as the plan view shape with respect to the upper surface 1a is less than 45°. Briefly, it can be confirmed by observing the magnetic particles 5 in the mold resin 4 in the section obtained by cutting the RFID tag 10 substantially perpendicularly to the upper surface of the insulating substrate 1. That is, as in the example illustrated in FIG. 3B, If the longitudinal direction of the major axis La of the section of the magnetic particle 5 appearing in the section of the RFID tag 10, in other words, the angle θ of the direction having the largest diameter with respect to the upper surface 1a of the insulating substrate 1 is less than 45°, the flat-shaped magnetic particles 5b may be considered to be disposed along the upper surface 1a of the insulating substrate 1.

Even if the magnetic particles 5 include the flat-shaped magnetic particles 5b, the magnetic particles 5 may also include magnetic particles 5a in spherical shape. If the magnetic particles 5 include the flat-shaped magnetic particles 5b, it is effective to increase the ratio of the presence of the magnetic particles 5 in the mold resin 4 in plan view.

In other words, it is possible to effectively increase the area of the whole magnetic particles 5 in plan view of the RFID tag 10 (when viewing the RFID tag 10 from above). When the content of the magnetic particles 5 in the mold resin 4 is substantially the same degree, if the flat-shaped magnetic particles 5b are included, the area of the magnetic particles 5 in plan view can be made larger. Therefore, even when the ratio of the resin material is increased in the mold resin 4 for the bonding or the like to the commodity 40, for example, the radio wave from the antenna 21 can be effectively guided in the direction of the coil conductor 2. In addition, since the content of the magnetic particles 5 in the mold resin 4 can be reduced, even if the magnetic particles 5 are conductive, the possibility of occurrence of a short circuit such as the bonding wires 6 due to the magnetic particles 5 can be reduced.

The flat-shaped magnetic particles 5b can be manufactured by appropriately adjusting the conditions at the time of particle forming in the various methods of manufacturing described above, for example, by adjusting the nozzle shape or the cooling condition in the atomization method. Furthermore, the flat-shaped magnetic particles 5b can also be manufactured by a method in which spherical magnetic particles 5a are first formed and then pressed to form a flat shape.

In the flat-shaped magnetic particles 5b, in order to dispose the flat surface extending along the upper surface 1a of the insulating substrate 1, the following method can be used. For example, first, when magnetic particles 5 are added to an uncured resin material which is to be the mold resin 4 and the resultant is applied to the upper surface 1a of the insulating substrate 1, the flat-shaped magnetic particles 5a are oriented by using the fact that the flat-shaped magnetic particles 5a are aligned in the flow direction such that the resistance becomes smaller in accordance with the fluid resistance of the resin material. Thereafter, the resin material may be cured by a method such as heating. The fluid resistance occurs, for example, in squeezing the resin material (flattening the surface with a squeegee, or the like). When squeezing, a force parallel to the upper surface 1a of the insulating substrate 1 is applied. Therefore, the flat surface of the flat-shaped magnetic particles 5b is parallel (sideways) to the upper surface 1a of the insulating substrate 1.

The flat-shaped magnetic particles 5b are made of, for example, iron, have an elliptical shapes in plan view and in side view, of which the major axis is approximately 10 to 50 μm and the minor axis in plan view is approximately 5 to 30 μm, and the minor axis (maximum thickness) in side view is approximately 5 to 30 μm.

In this case also, the particle size of the flat-shaped magnetic particles 5b may be appropriately distributed within the range described above. The particle size in such range can be measured as, for example, the major axis of the flat-shaped magnetic particles 5b.

The ratio of the flat-shaped magnetic particles 5b in the magnetic particles 5 may be higher in the lower part of the mold resin 4 than in the upper part. In other words, the more flat-shaped magnetic particles 5b may be contained in the part of the mold resin 4 closer to the coil conductor 2.

In this case, in a part closer to the coil conductor 2, the area of the whole magnetic particles 5 in plan view can be effectively and easily increased. Therefore, in this case also, the magnetic flux can be effectively guided to the coil conductor 2 (the center of the coil conductor 2), information can be easily transmitted and received wirelessly between the coil conductor 2 (RFID tag 10) and the antenna 21 (reader/writer 20). Similarly to the effect when the more magnetic particles 5 are contained in the lower part of the mold resin 4 as described above, this effect can be effectively obtained even if the commodity 40 is made of a metal such as an industrial jig or a medical device.

In order to make the ratio of the flat-shaped magnetic particles 5b in the magnetic particles 5 higher in the lower part of the mold resin 4 than in the upper part, the method described above can be used, in which the fluid resistance of the uncured resin material which is to be the mold resin 4 is used. For example, magnetic particles 5 including spherical shaped magnetic particles and flat-shaped magnetic particles may be added to uncured resin material so that the flat-shaped magnetic particles 5b having a larger resistance sink faster to the lower part of the resin material, and then, the resin material may be cured by heating or ultraviolet irradiation.

In addition, in this case, once the mold resin 4 in which the ratio of the flat-shaped magnetic particles 5b in the magnetic particles 5 is adjusted is applied and cured, and then, a mold resin 4 in which the ratio of the flat-shaped magnetic particles 5b is adjusted to a ratio different from that of the applied mold resin 4 may be applied to the applied upper part, and be cured. That is, for example, the mold resin 4 can be formed by applying the uncured resin material in which the magnetic particles 5 include the spherical shaped magnetic particles and the flat-shaped magnetic particles and the ratio of the flat particles is high so as to cover the upper surface 1*a* of the insulating substrate 1 and the semiconductor element 3, and then, by applying and curing the uncured resin material thereon, in which the magnetic particles 5 include the spherical shaped magnetic particles and the flat-shaped magnetic particles and the ratio of flat-shaped particles is lower.

Figure 4A:
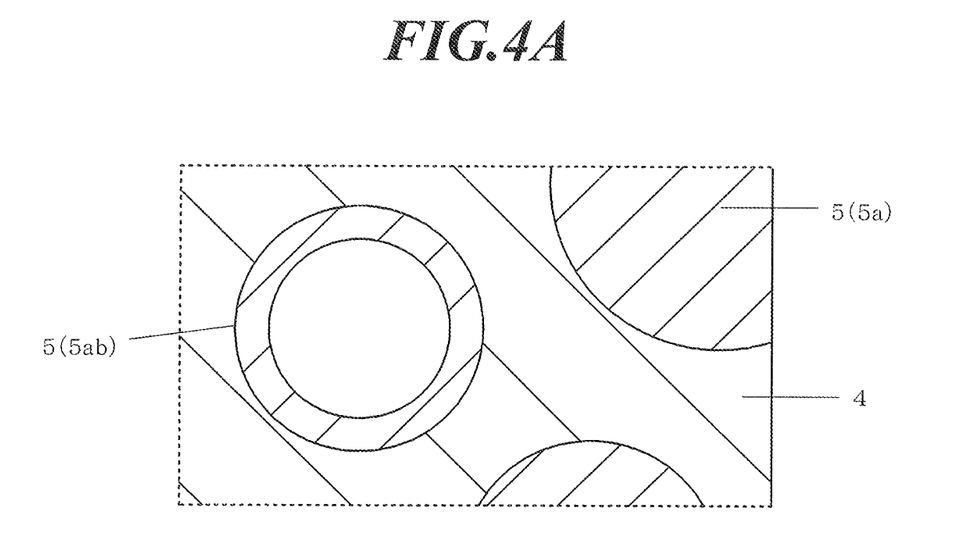
FIG. 4A and FIG. 4B are enlarged sectional views illustrating another example of the main part of FIG. 1.
Figure 4B:
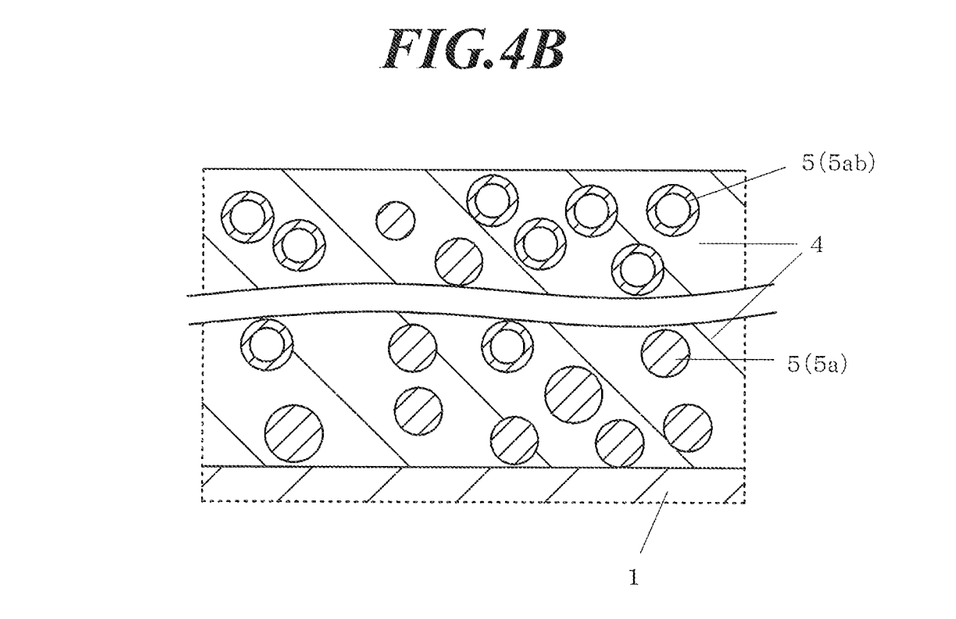

In the RFID tag 10 and the RFID system 30 in the embodiment, as illustrated in FIG. 4A, for example, the magnetic particles 5 (the spherical shaped magnetic particles 5*a*) may include a hollow magnetic particles 5*ab*. FIG. 4A and FIG. 4B are enlarged sectional views illustrating another example of the main part of FIG. 1. In FIG. 4A and FIG. 4B, the same reference numerals are given to the parts similar to those in the drawings.

If the magnetic particles 5 include the hollow magnetic particles 5*ab*, the RFID tag 10 and the RFID system 30 are also effective for reducing the stress in the magnetic particles 5 (5*ab*) while effectively securing the surface area of the magnetic particles 5*a*, that is, the area of the magnetic material in plan view effective for inducing the magnetic flux.

That is, the hollow magnetic particles 5*ab* are easy to deform as compared to the non-hollow (so-called solid) magnetic particles 5*a*. Therefore, even if a stress such as a thermal stress due to a difference in thermal expansion coefficients between the mold resin 4 and the insulating substrate 1 acts on the mold resin 4, for example, the stress can be easily absorbed and relaxed by the deformation of the hollow magnetic particles 5*ab*. Therefore, the RFID tag 10 and the RFID system 30 are effective for improving the reliability of bonding the mold resin 4 to the insulating substrate 1.

The stress acting on the mold resin 4 is not limited to the above-described thermal stress, and other examples include the stress generated at the time of handling such as transportation of the RFID tag 10 or adhering the RFID tag 10 to the commodity 40, the stress generated by a shock caused by falling or collision of the commodity 40, and the like.

The hollow magnetic particles 5*ab* may be formed by causing the particle to generate gas when manufacturing the magnetic particles 5 by using the atomizing method, for example. For example, in a water atomization method, a small amount of carbon component is added to iron as a magnetic material, gas is generated in the particles of the magnetic material due to the reaction between oxygen and carbon, and then, the magnetic particles 5 become hollow by this gas.

Even when the magnetic particles 5 (5*a*) include hollow magnetic particles 5*ab*, the magnetic particles 5 (5*a*) may contain solid magnetic particles 5*a*. In this case, the ratio of the hollow magnetic particles 5*ab* in the magnetic particles 5 (5*a*) may be appropriately determined in accordance with the conditions such as stress to be relaxed, reliability desired, productivity and economic efficiency (cost) for the RFID tag 10. For example, when the mold resin 4 is an epoxy resin and the particle size of the magnetic particles 5 made of iron is approximately 0.5 to 50 µm, for example, the ratio of the hollow magnetic particles 5*ab* in the magnetic particles 5 may be approximately 0.1 to 50 vol %.

In addition, even by adding a relatively small amount, the hollow magnetic particles 5*ab* can effectively relax the thermal expansion and the like by entering between the non-hollow magnetic particles 5*a*. However, if the ratio of the hollow magnetic particles 5*ab* is excessively high, the magnetic material density in the mold resin 4 may become sparse on the insulating substrate 1 side. In such a case, characteristics such as the thermal expansion coefficient in the mold resin 4 become non-uniform (unbalanced). Therefore, when the RFID tag 10 is exposed to a high-temperature environment when being used in the RFID system 30, it may be difficult to improve the mutual bonding reliability at the interface between the mold resin 4 and the insulating substrate 1.

The ratio of the hollow magnetic particles 5*ab* in the magnetic particles 5 may be higher in the upper part of the mold resin 4 than in the lower part as illustrated in FIG. 4B, for example. In this case, stress can be relaxed more effectively on the upper part of the mold resin 4, which is closer to the external environment and is more likely to receive stress due to a shock or the like. Therefore, in this case, for example, when being used in the environment in which a stress may be erroneously added, the RFID tag 10 and the RFID system 30 are effective for improving the reliability.

In order to make the ratio of the hollow magnetic particles 5*ab* in the magnetic particles 5 higher in the upper part of the mold resin 4 than in the lower part, for example, the difference in the density between hollow magnetic particles and the solid magnetic particles in the resin material (having fluidity) which is to be the mold resin 4 may be used. In this case, the hollow magnetic particles 5*ab* and the solid magnetic particles 5*a* receive the same degree of buoyancy within the resin material in the middle of forming the mold resin 4 including the magnetic particles 5, but the hollow magnetic particles have smaller mass. Accordingly, the hollow magnetic particles 5*ab* are more likely to move to the upper part of the resin material which is to be the mold resin 4. Therefore, it is possible to make the ratio of the hollow magnetic particles 5*ab* higher in the upper part of the mold resin 4 than in the lower part. Alternatively, the ratio of the hollow magnetic particles 5*a* can be adjusted also by dividing the step of applying the uncured resin material including the magnetic particles 5 on the insulating substrate 1 in two steps. Specifically, the curing steps can be performed as: applying the uncured resin material having a low ratio of the hollow magnetic particles 5*ab* and 5*bb* on the insulating substrate 1, and then, further applying the uncured resin material having a high ratio of the hollow magnetic particles 5*ab* and 5*bb* thereon.

Figure 5A:
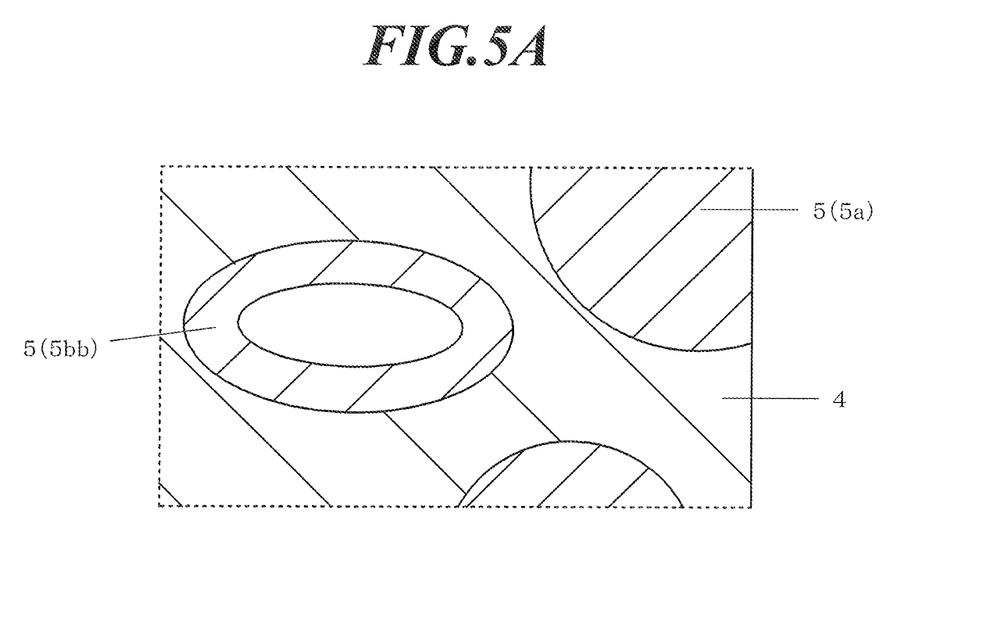
FIG. 5A and FIG. 5B are enlarged sectional views illustrating still another example of the main part of FIG. 1.
Figure 5B:
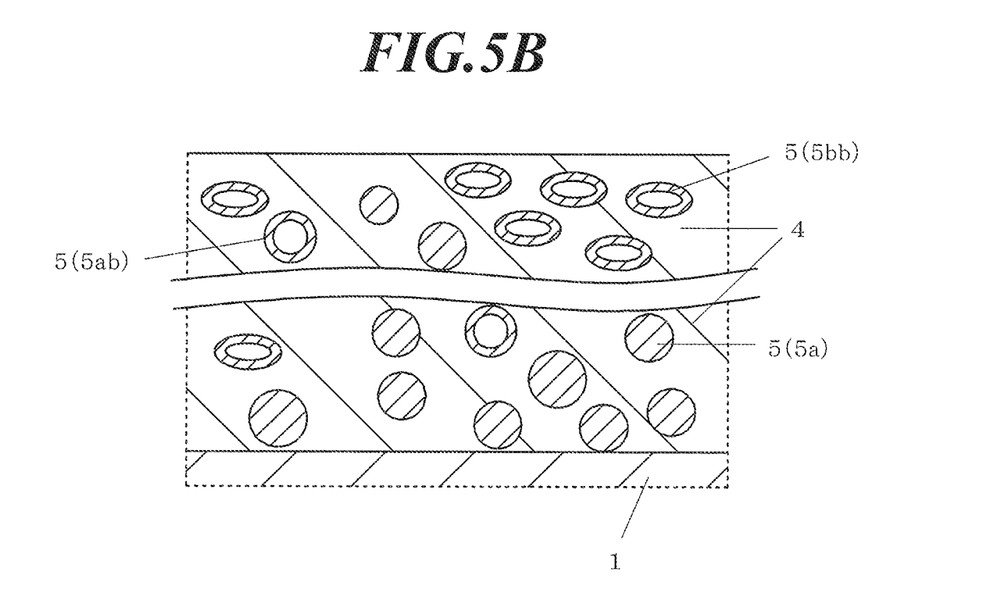

FIG. 5A and FIG. 5B are enlarged sectional views illustrating still another example of the main part of the RFID tag 10 illustrated in FIG. 1. In FIG. 5A and FIG. 5B, the same reference numerals are given to the parts similar to those in FIG. 1. In an example illustrated in FIG. 5A, the magnetic particles 5 include spherical shaped magnetic particles 5*a* and flat-shaped magnetic particles 5*b*. In addition, the magnetic particles 5 include spherical shaped and hollow magnetic particles 5*ab* and flat-shaped and hollow magnetic particles 5*bb*.

This example can be regarded as an example including combinations of the shapes of the magnetic particles 5 in the examples described above. In this case, it is possible to obtain the same effect as the effect in each example described above. That is, since the flat-shaped magnetic particles 5*b* and 5*bb* are included, it is possible to easily increase the area of the magnetic particles 5 in plan view. Therefore, the RFID tag 10 is effective for inducing the magnetic flux in the direction of the coil conductor 2.

In addition, the RFID tag 10 and the RFID system 30 having the mold resin 4 can easily mitigate the stress caused by the thermal stress or the impact by including the hollow magnetic particles 5*ab* and 5*bb*. In this case, in order for the relaxation of the stress from the outside, for both the spherical shaped and the flat-shaped magnetic particles, it is preferable that the content of the hollow magnetic particles 5ab and 5bb is higher in the upper part of the mold resin 4 than in the lower part.

In this case also, as described above, using the difference in density between the hollow magnetic particles 5ab and 5bb and the solid magnetic particles 5ab, it is possible to make content of the magnetic particles 5 higher in the upper part of the mold resin 4. In addition, the method described above in which the resin materials having different content of the hollow magnetic particles 5ab and 5bb are prepared and applied in two steps, can also be used.

The RFID tag 10 and the RFID system 30 in an embodiment include a terminal 7 that is electrically connected to the coil conductor 2 and disposed on the upper surface 1a of the insulating substrate 1. The terminal 7 is electrically connected to the semiconductor element 3 via a bonding wire 6.

By disposing such a terminal 7, the electrical connection between the semiconductor element 3 and the coil conductor 2 may be performed easily.

For example, the terminal 7 has a rectangular shape or a circular shape in plan view, and can be formed by the same method using the same metal material as the coil conductor 2. In addition, a plating layer (not illustrated) such as nickel and gold may be formed on the surface of the terminal 7. With this, it is advantageous for suppressing oxidation of the terminal 7 and the like and improving the bonding characteristics of the bonding wire 6.

The electrical connection between the coil conductor 2 and the semiconductor element 3 is not necessarily performed via the terminal 7, but for example, an end portion of the coil conductor 2 is exposed to the upper surface 1a of the insulating substrate 1, and then, the electrode of the semiconductor element 3 may be connected to this exposed portion. In addition, the electrical connection between the coil conductor 2 and the semiconductor element 3 may be performed via connecting means (not illustrated) such as a metal bump other than the bonding wire 6.

When the bonding wire 6 is used to connect to the terminal 7, since the bonding wire 6 passes through the magnetic particles 5, the inductance value of the bonding wire 6 increases and the inductance value of the coil conductor 2 in the insulating substrate 1 can be decreased. As a result, since the length of the coil conductor 2 can be shortened, it is advantageous in minimizing the size of the RFID tag 10. In addition, the length of the coil conductor 2 is shortened and the resistance can be reduced, and thus, the communication loss is reduced, therefore, it is advantageous in a point that the communication distance between the RFID tag 10 and the antenna 21 increases. If the communication distance increases, for example, a period of time for bringing the commodity 40 closer to the reader/writer 20 (held by hand) is shortened, and thus, the practicality is improved.

As described above, the RFID system 30 in the embodiment is basically configured using the RFID tag 10 having any of the above-described configurations and the reader/writer 20 having the antenna 21 facing the coil conductor of the RFID tag 10. An example of the RFID system 30 is as illustrated in FIG. 2. In this example, the commodity 40 on which the RFID tag 10 is mounted is used such that the commodity 40 is approached to the reader/writer 20 electrically connected to an information processing device (not illustrated) that includes a processor having a function of storing information and computing. The commodity 40 is a variety of tools and the like as described above.

The RFID tag 10 may be approached to the reader/writer 20 by manual operation (with the commodity 40 being held by hand and brought close to the reader/writer 20), or by making the commodity 40 (RFID tag 10) automatically pass nearby the reader/writer 20 by using transportation equipment.

The RFID tag and the RFID system 30 in the present disclosure are not limited to the examples in the embodiments described above, and various modifications can be made within the scope of the present disclosure.

For example, in the example of FIG. 2, the antenna 21 of the reader/writer 20 may be inclined so as to facilitate the operation of approaching the RFID tag 10 by hand, or the arrangement of the RFID tag 10 and the reader/writer 20 may be inverted. Any modification can be taken as long as the semiconductor element 3 is set to be positioned between the antenna 21 and the coil conductor 2.

Further, unevenness (not illustrated) may be formed on the upper surface 1a of the insulating substrate 1 and the bonding strength between the insulating substrate 1 and the mold resin 4 may increase.

REFERENCE SIGNS LIST 1 insulating substrate
1a upper surface
2 coil conductor
3 semiconductor element
4 mold resin
5 magnetic particle
5a magnetic particle (spherical shape)
5b magnetic particle (flat shape)
5ab magnetic particle (spherical shape and hollow)
5bb magnetic particle (flat shape and hollow)
6 bonding wire
7 terminal
10 RFID tag
20 reader/writer
21 antenna
30 RFID system
40 commodity

The invention claimed is:

1. An RFID tag comprising:
an insulating substrate with an upper surface;
a coil conductor in the insulating substrate;
a semiconductor element on the upper surface of the insulating substrate; and
a mold resin covering the upper surface of the insulating substrate and the semiconductor element, wherein
the mold resin contains a plurality of magnetic particles having particle sizes different from each other, and
a content of the magnetic particles in the mold resin is higher in a lower part of the mold resin than in an upper part of the mold resin.

2. The RFID tag according to claim 1, wherein
the magnetic particles comprise flat-shaped magnetic particles, and
the flat-shaped magnetic particles are disposed with a flat surface extending along the upper surface of the insulating substrate.

3. The RFID tag according to claim 2, wherein
a ratio of the flat-shaped magnetic particles to the magnetic particles is higher in the lower part of the mold resin than in the upper part of the mold resin.

4. The RFID tag according to claim 2, wherein
the magnetic particles comprise hollow magnetic particles.

5. The RFID tag according to claim 4, wherein
a ratio of the hollow magnetic particles to the magnetic particles is higher in the upper part of the mold resin than in the lower part of the mold resin.

6. The RFID tag according to claim 4, further comprising:
a terminal on the upper surface of the insulating substrate, electrically connected to the coil conductor, and electrically connected to the semiconductor element via a bonding wire.

7. The RFID tag according to claim 2, further comprising:
a terminal on the upper surface of the insulating substrate, electrically connected to the coil conductor, and electrically connected to the semiconductor element via a bonding wire.

8. The RFID tag according to claim 3, wherein
the magnetic particles comprise hollow magnetic particles.

9. The RFID tag according to claim 3, further comprising:
a terminal on the upper surface of the insulating substrate, electrically connected to the coil conductor, and electrically connected to the semiconductor element via a bonding wire.

10. The RFID tag according to claim 1, wherein
the magnetic particles comprise hollow magnetic particles.

11. The RFID tag according to claim 10, wherein
a ratio of the hollow magnetic particles to the magnetic particles is higher in the upper part of the mold resin than in the lower part of the mold resin.

12. The RFID tag according to claim 10, further comprising:
a terminal on the upper surface of the insulating substrate, electrically connected to the coil conductor, and electrically connected to the semiconductor element via a bonding wire.

13. The RFID tag according to claim 11, further comprising:
a terminal on the upper surface of the insulating substrate, electrically connected to the coil conductor, and electrically connected to the semiconductor element via a bonding wire.

14. The RFID tag according to claim 1, further comprising:
a terminal on the upper surface of the insulating substrate, electrically connected to the coil conductor, and electrically connected to the semiconductor element via a bonding wire.

15. An RFID system comprising:
the RFID tag according to claim 1; and
a reader/writer comprising an antenna facing the coil conductor of the RFID tag.

16. The RFID tag according to claim 1, wherein
the magnetic particles comprise flat-shaped magnetic particles,
the flat-shaped magnetic particles are disposed with a flat surface extending along the upper surface of the insulating substrate, and
a ratio of the flat-shaped magnetic particles to the magnetic particles is higher in the lower part of the mold resin than in the upper part of the mold resin.

17. The RFID tag according to claim 16, further comprising:
a terminal on the upper surface of the insulating substrate, electrically connected to the coil conductor, and electrically connected to the semiconductor element via a bonding wire.

18. The RFID tag according to claim 1, wherein
the magnetic particles comprise hollow magnetic particles, and
a ratio of the hollow magnetic particles to the magnetic particles is higher in the upper part of the mold resin than in the lower part of the mold resin.

19. The RFID tag according to claim 18, further comprising:
a terminal on the upper surface of the insulating substrate, electrically connected to the coil conductor, and electrically connected to the semiconductor element via a bonding wire.

* * * * *